United States Patent [19]

Gouvenot

[11] Patent Number: 5,059,251

[45] Date of Patent: Oct. 22, 1991

[54] INJECTION PRODUCT FOR SEALING AND/OR CONSOLIDATING SOILS AND BUILDING MATERIALS, AND A METHOD FOR ITS EMPLOYMENT

[75] Inventor: Daniel Gouvenot, Clichy, France

[73] Assignee: Societe Anonyme dite - Soletanche, Nanterre, France

[21] Appl. No.: 449,960

[22] PCT Filed: Mar. 31, 1989

[86] PCT No.: PCT/FR89/00149

§ 371 Date: Jan. 29, 1990

§ 102(e) Date: Jan. 29, 1990

[87] PCT Pub. No.: WO89/09197

PCT Pub. Date: Oct. 5, 1989

[30] Foreign Application Priority Data

Apr. 1, 1988 [FR] France ............................... 88 04363

[51] Int. Cl.$^5$ ............................................. C04B 12/04
[52] U.S. Cl. ..................... 106/633; 106/612; 106/624; 106/790; 106/811; 106/900
[58] Field of Search ............... 106/624, 789, 790, 791, 106/811, 612, 117, 900, 633

[56] References Cited

U.S. PATENT DOCUMENTS

| | | | |
|---|---|---|---|
| 1,823,928 | 9/1931 | Bjorkman | 106/789 X |
| 2,016,796 | 10/1935 | Brock et al. | 106/624 |
| 4,761,183 | 8/1988 | Clarke | 106/624 |

FOREIGN PATENT DOCUMENTS

| | | | |
|---|---|---|---|
| 7206150 | 9/1972 | France. | |
| 8309647 | 6/1983 | France. | |
| 0115057 | 7/1983 | Japan | 106/117 |
| 1386008 | 3/1975 | United Kingdom. | |
| 2124276 | 2/1984 | United Kingdom. | |

OTHER PUBLICATIONS

Chemical Abstracts, vol. 106, Nr. 16, Apr. 1987 (Columbus, Ohio, U.S.), see p. 344, Abstract 125079w, and JP, A, 61283683 (Kyowa Kaihatsu K.K.) Dec. 13, 1986.

*Primary Examiner*—Karl Group
*Attorney, Agent, or Firm*—Schweitzer Cornman & Gross

[57] ABSTRACT

Impermeabilization and/or consolidation product for soils and building materials, usable by injection, characterized by the fact that it is obtained by mixture of a compound of slag in suspension in water and of a silica liquor having a ratio of $SiO_2Na_2O$ lower than 2 and a silica content greater than about 10% by weight.

10 Claims, No Drawings

INJECTION PRODUCT FOR SEALING AND/OR CONSOLIDATING SOILS AND BUILDING MATERIALS, AND A METHOD FOR ITS EMPLOYMENT

BACKGROUND AND SUMMARY OF THE INVENTION

The present invention relates to an injection product for the impermeabilization and/or consolidation of soils and building materials, such as mortars, binders, masonry, concretes etc., having more or less deep fissures or voids that might result in porosity and hence permeability.

The present invention relates also to a method of employing such an injection product for the purpose of improving the impermeability of and/or of consolidating such soils and building materials.

More particularly, the present invention is intended for the treatment of particularly fine or very fine materials and soils to modify their consistency.

For the sealing and/or consolidation of soils and materials it is current practice to use cement-base sealing and/or consolidating products still called "grouts" when the pores are more or less large, or silica gel type products obtained by jelling sodium silicate, when the pores are particularly fine.

This latter class of grouts, however, may cause the problem of polluting the soil, particularly at the level of the water tables, and also of poor durability since the structure of the gels obtained may not be lastingly stable. This phenomenon, known as "syneresis," can be very harmful to the gels obtained from silicate solutions.

To remedy the deficiencies of these injection grouts French patent No.83.09647 has proposed an injection grout particularly for micropores and microfissures, which is in the form of a noncolloidal silica liquor obtained by dissolving at ambient temperature silica having an average particle diameter less than 100 microns in soda, the ratio of $SiO_2$ to $Na_2O$ being less than 2 and the silica content of the solution being preferably greater than about 20% by weight.

This type of grout is highly reactive to calcium, which is present in building materials and certain soils, and therefore leads to a mineralization of soils and/or building materials by the formation of stable and insoluble hydrated calcium silicates, thus assuring the permanence of the treatment performed on these soils and materials.

These grouts present certain problems, however, due to the fact that the setting time has proven to be particularly sensitive to temperature conditions and to the concentrations of the various products present.

In certain applications it is particularly important to have grouts that have a constant and controllable setting time.

When the point of injection is remote from the place where the grout is prepared it is important to have grouts which have a variable but constant setting time, so as to assure good repeatability of the injection operations.

In French Patent No. 72.06150 it has been proposed, in order to vary the setting time, to replace a portion of the cement of an injection grout containing sodium silicate or an aqueous solution of sodium silicate and a cement paste, with a mineral substance having latent hydraulic properties, such as a finely granulated slag.

Although the addition of slag actually does affect the setting time, it is too fast, even with heavy concentrations of slag. Furthermore, this type of sodium silicate base grout already has, at time $t=0$, a high viscosity ($>15$ cp) which does not allow it to be injected into very fine soils such as Fontainebleau sands.

The present invention permits the solution of the problems involved in known grouts and therefore it proposes a sealing and/or consolidation product for soils and building materials having a stable and controllable setting time and having furthermore an appropriate viscosity to permit good penetration into fine or very fine soils as well as in the fissures and microfissures in building materials.

Quite surprisingly and unexpectedly, it has been found that, in accordance with the invention, the addition of slag to the grout in accordance with French patent No. 83.09647 resulted in setting times of longer than about 1 hour, whereas the grout according to French patent No. 72.06150 had a setting time of several minutes or, in any case, less than one hour.

Such a difference in reactivity was quite unforeseeable inasmuch as it is well known that grouts based on silica liquor have a much greater reactivity than grouts based on sodium silicate.

DETAILED DESCRIPTION OF THE INVENTION

The sealing and/or consolidating product according to the invention has preferably a viscosity at $t=0$ of generally between 4 and 6 centipoises (cp).

The slag compound should be preferably of the basic type and have a ratio of $CaO:SiO_2$ between 1.10 and 1.35.

According to the invention a blast furnace slag is preferably used which has the following chemical composition by weight:

$SiO_2 = 33$ to 40%
$Al_2O_3 = 8$ to 16%
$CaO = 40$ to 45% the balance consisting of $MgO$, $Fe_2O_3$, $K_2O$, $Na_2O$, S—, $MnO$, $TiO_2$ and other traces of minor elements.

The granulometry of the slag is of some importance in that the average diameter of the particles should be smaller than the pores and microfissures that are to be injected with the grout.

In practice, the diameter of the slag particles is generally between 0 and 120 microns, which corresponds to a Blaine specific surface area of 3,000 to 4,000 $cm^2/g$.

For the injection of particularly fine pores and microfissures the slag can be in the form of very fine particles having a Blaine specific surface area of about 10,000 $cm^2/g$.

Also usable as a slag compound according to the invention is a slag-base cement in which the slag percentage is greater than 60% by weight, particularly cements of type CLK 45, which are clinker slag cements containing more than 80% by weight of slag.

The silica liquor which is added to the slag has the effect of catalyzing the setting and curing reactions.

This liquor is obtained by dissolving, at ambient temperature, silica of an average particle diameter of preferably less than 100 microns in soda, the $SiO_2:Na_2O$ ratio being, as indicated above, less than 2 but preferably between 1.5 and 1.8.

The silica used can be silica in the pure state or, preferably, siliceous products containing at least 80 to 90% by weight of $SiO_2$ of a nonvitreous structure.

Particularly to be mentioned among the preferred compounds are the pyrogenic silicas also called smoky silicas originating from industrial wastes, kieselguhr, gaize, or also silica aerogels.

The granulometry of the silica for obtaining quick and complete dissolution in the soda must be under 100 microns, and preferably under 50 microns.

The soda used for dissolving the silica is preferably in the form of a solution of between 35° and 37° B, i.e., one having a density between about 1.32 and 1.35.

The amount of silica liquor can be variable, but it is generally between 20 and 80 liters per 100 kg of the slag compound.

The studies that have been made have shown that the greater the amount of silica liquor was with respect to the slag compound, the faster was the setting time.

The setting time of one hour was observed for a grout containing 45 liters of silica liquor per 100 kg of blast furnace slag, and a setting time of about 2 hours for a grout containing 35 liters of silica liquor per 100 kg of slag.

The amount of water in the grout according to the invention, for the suspension of the particles of the slag compound, will depend on the strength and on the viscosity that it is desired to obtain.

This amount of water is generally between 200 and 1000 liters, and preferably between 500 and 800 liters, per 100 kg of the slag compound.

According to a preferred embodiment of the invention, the grout can also contain calcium carbonate powder which can be made by crushing marble, limestone or calcite.

This charge of calcium carbonate is particularly recommended for the treatment of certain soils and/or materials of low lime content.

According to this embodiment, the silica liquor reacts with the $Ca^{++}$ ions which are released progressively by hydrolysis to form insoluble and stable hydrated calcium silicates.

The presence of calcium carbonate powder moreover makes it possible to regulate the viscosity and the strength of the grout. If necessary, it is also possible to add quicklime or slaked lime to regulate the curing time.

In fact, for certain applications, it is particularly important to make the curing time as short as possible, particularly in fast-draining soils.

The present invention also has as its subject matter a process of sealing and/or consolidation, this process consisting of injecting under pressure the grout in accord with the invention, as defined above, into the pores or microfissures of soils or building materials by means of conventional injection apparatus. The process according to the invention is quite particularly intended for the treatment of ground that is to be impermeabilized or to be consolidated, whether it be fissured rock or alluvial soils.

The injection pressure is generally between 5 and 20 bar and the amount of grout between 2 and 40% of the volume of the ground that is to be treated.

When impermeabilization is being performed, the treatment can be monitored by taking a sample and subjecting it to permeability measurements.

For the purpose of aiding in the comprehension of the invention, a number of examples of the making and employment of the grout in accordance with the invention will now be described by way of illustration, without in any way limiting the invention thereto.

EXAMPLE 1

For the purpose of impermeabilizing a fine sand by injection, first of all a suspension is prepared of 145 kg of blast furnace slag ($CaO:SiO_2=1.20$) having an average particle diameter of 10 microns in 1,000 liters of water. To this suspension are added 90 kg of slaked lime and 60 liters of silica liquor obtained in the following manner:

170 kg of silica of an average grain size of about 50 microns is dissolved in 300 liters of soda of 36° B and 70 liters of water. A slight exothermic reaction is noted during dissolution (the characteristics of the solution after formation were the following: ratio $SiO_2:Na_2O=1.8\%$, $SiO_2=26.6\%$; $Na_2O=14.8\%$; $H_2O=58.6\%$; viscosity 40–50 cp).

The grout thus obtained has a viscosity (t=0) of 5 cp and a setting time of 1 h30, and a curing time of 4 hours.

This grout is then pressure-injected by conventional techniques through an injection tube introduced by drilling. When the back pressure became steady at about 10 bar the injection was stopped. A permeability test shows a perfect impermeabilization of the ground thus treated.

EXAMPLE 2

The precedure was as in Example 1, but with a quantity of 100 liters of silica liquor. In this case it was found that the setting time was 1 hour and the curing time 4 hours.

EXAMPLE 3

The procedure was as in Example 1, but using a grout obtained by suspending 300 kg of blast furnace slag in 1,000 liters of water and adding 180 liters of the same silica liquor.

EXAMPLE 4

The procedure was as in Example 1, but using a grout obtained by suspending 150 kg of CLK 45 cement in 1,000 liters of water and adding 100 liters of the same silica liquor. The setting time of this grout was 1 hour.

I claim:

1. An improved injection product for impermeabilization and/or consolidation of soils and building materials, comprising a mixture of:
   (a) a compound of slag in suspension in water; and
   (b) a silica liquor which is dissolved silica having an average particle diameter less than 100 microns in soda; having a ratio of $SiO_2/Na_2O$ less than 2 and a silica content greater than about 10% by weight.

2. An injection product according to claim 1, characterized by the fact that:
   (a) the slag compound has a $CaO:SiO_2$ ratio between 1.10 and 1.35.

3. An injection product according to claim 1, characterized by the fact that:
   (a) the slag compound is blast furnace slag which has a particle diameter less than 120 microns.

4. An injection product according to claim 1, characterized by the fact that:
   (a) the slag compound is CLK cement containing more than 80% by weight of blast furnace slag.

5. An injection product according to claim 1, characterized by the fact that:
   the $SiO_2:Na_2O$ ratio is between 1.5 and 1.8.

6. An injection product according to claim 1, characterized by the fact that:

(a) the amount of silica liquor per 100 kg of slag compound is between 20 and 80 liters.

7. An injection product according to claim 1, characterized by the fact that:
(a) the amount of water for the suspension of the slag compound is between 200 and 1,000 liters per 100 kg of the slag compound.

8. An injection product according to claim 1, characterized by the fact that:
(a) the product further contains calcium carbonate power.

9. A method for the impermeabilization and/or consolidation of soils and building material, including the step of injection under pressure of a mixture of a compound of slag in suspension in water and a silica liquor which is dissolved silica having an average particle diameter less than 100 microns in soda; having a ratio of $SiO_2/Na_2O$ less than 2 and a silica content greater than about 10% by weight.

10. The method of claim 9 further characterized in that the injection pressure is 5–20 bar and the volume of the injected mixture is 2–40 percent of the volume of material being treated.

* * * * *